US012631167B2

(12) United States Patent
Cobb et al.

(10) Patent No.: US 12,631,167 B2
(45) Date of Patent: May 19, 2026

(54) PULSATION DAMPENER FOR SINGLE USE APPLICATIONS

(71) Applicant: Equilibar, LLC, Fletcher, NC (US)

(72) Inventors: Zachary Allan Cobb, Candler, NC (US); Jeffrey D. Jennings, Hendersonville, NC (US); Carlyle Leonard Donevant, IV, Asheville, NC (US); Ryan Matthew Heffner, Asheville, NC (US); Tony Boyd Tang, Mills River, NC (US)

(73) Assignee: Equilibar, LLC, Fletcher, NC (US)

( * ) Notice: Subject to any disclaimer, the term of this patent is extended or adjusted under 35 U.S.C. 154(b) by 449 days.

(21) Appl. No.: 18/548,251

(22) PCT Filed: Mar. 2, 2022

(86) PCT No.: PCT/US2022/018486
§ 371 (c)(1),
(2) Date: Aug. 29, 2023

(87) PCT Pub. No.: WO2022/187338
PCT Pub. Date: Sep. 9, 2022

(65) Prior Publication Data
US 2024/0141879 A1 May 2, 2024

Related U.S. Application Data

(60) Provisional application No. 63/155,672, filed on Mar. 2, 2021.

(51) Int. Cl.
*F04B 11/00* (2006.01)
*F04B 43/12* (2006.01)
(Continued)

(52) U.S. Cl.
CPC .............. *F04B 11/00* (2013.01); *F04B 43/12* (2013.01); *F16K 7/17* (2013.01); *F16K 31/1266* (2013.01)

(58) Field of Classification Search
CPC ...... F04B 11/00; F04B 43/12; F04B 11/0008; F04B 11/0016; F04B 11/0033; F16K 7/17; F16K 31/1266; F16K 17/34
(Continued)

(56) References Cited

U.S. PATENT DOCUMENTS

| | | | | |
|---|---|---|---|---|
| 2,609,001 A | * | 9/1952 | Hebard | F16L 55/052 |
| | | | | 138/30 |
| 2,841,181 A | * | 7/1958 | Hewitt | F16L 55/054 |
| | | | | 138/30 |

(Continued)

OTHER PUBLICATIONS

International Search Report and Written Opinion issued on Jun. 15, 2022 for related International Patent Application No. PCT/US2022/018486.

*Primary Examiner* — Muhammad Ijaz
(74) *Attorney, Agent, or Firm* — Shumaker, Loop & Kendrick, LLP

(57) ABSTRACT

A pulsation dampener includes: a centerbody assembly having: a chamber including a first opening bounded by a wall defining a first surface; an outlet port communicating with the chamber; an inlet port communicating with the chamber; a flexible first diaphragm, wherein a perimeter of the first diaphragm is bonded to the first surface forming a seal that blocks the passage of fluid; a first cap disposed adjacent the first diaphragm, defining a first cavity between the first cap and the first diaphragm; an inlet orifice formed in the first cap communicating with the first cavity; an exhaust orifice formed in the first cap communicating with the first cavity; and a valve seat disposed in the first cavity in fluid communication with the exhaust orifice. The first (Continued)

diaphragm is moveable between an open position spaced away from the valve seat, and a closed position sealed against the valve seat.

12 Claims, 3 Drawing Sheets

(51) Int. Cl.
  *F16K 7/17* (2006.01)
  *F16K 31/126* (2006.01)
(58) Field of Classification Search
  USPC .......................................................... 138/30
  See application file for complete search history.

(56) References Cited

U.S. PATENT DOCUMENTS

| | | | | | |
|---|---|---|---|---|---|
| 2,875,787 | A | * | 3/1959 | Evans | F16L 55/054 |
| | | | | | 138/30 |
| 3,065,766 | A | * | 11/1962 | Wenzl | F16L 55/052 |
| | | | | | 138/30 |
| 3,169,551 | A | * | 2/1965 | Lewis | F16L 55/052 |
| | | | | | 138/26 |
| 5,509,787 | A | * | 4/1996 | Valdes | F04B 49/022 |
| | | | | | 200/81.9 R |
| 5,732,741 | A | * | 3/1998 | Shiery | F16L 55/054 |
| | | | | | 138/30 |
| 5,735,313 | A | * | 4/1998 | Jenski, Jr. | F04D 29/669 |
| | | | | | 138/30 |
| 5,860,452 | A | * | 1/1999 | Ellis | F16L 55/054 |
| | | | | | 138/30 |
| 6,016,841 | A | * | 1/2000 | Larsen | F16L 55/053 |
| | | | | | 138/30 |
| 6,286,552 | B1 | * | 9/2001 | Shimbori | B23K 11/002 |
| | | | | | 220/721 |
| 9,027,600 | B2 | * | 5/2015 | Yamashita | F16L 55/053 |
| | | | | | 220/721 |
| 2008/0142747 | A1 | * | 6/2008 | Jennings | F16K 7/075 |
| | | | | | 251/5 |
| 2008/0289173 | A1 | * | 11/2008 | Sullivan | H01R 43/015 |
| | | | | | 29/748 |
| 2009/0242045 | A1 | * | 10/2009 | Jennings | F16K 27/0236 |
| | | | | | 137/510 |
| 2020/0332751 | A1 | * | 10/2020 | Hwang | F02M 55/025 |
| 2021/0310481 | A1 | * | 10/2021 | Roman | F04B 45/0536 |
| 2024/0416165 | A1 | * | 12/2024 | Hagbi | F16K 7/126 |
| 2024/0418160 | A1 | * | 12/2024 | Metzler | F04B 13/00 |
| 2025/0189065 | A1 | * | 6/2025 | Donevant, IV | F04B 11/0033 |

* cited by examiner

PULSATION DAMPENER FOR SINGLE USE APPLICATIONS

BACKGROUND OF THE INVENTION

The present invention relates to pulsation dampeners, and more particularly to pulsation dampeners which are suitable for single-use applications.

There are many types of pulsation dampeners available in the process industries. A common need is to smooth out the flow variation from a positive displacement pump such as a diaphragm pump, peristaltic pump, piston pump, or vane pump through attempting to control the pressure variations in the system. Many pulsation dampeners include diaphragm or cylindrical elements with compressed air behind the membranes to absorb positive pressure pulsations and to lessen negative pressure drops.

While most air loaded dampeners use a static air pressure load, other types can adjust the air pressure to follow the movement of a platen/diaphragm assembly However, many of these features are difficult to integrate into a sanitary presentation, and often sacrifice on one or more variables (size, dampening effect, etc.).

In biopharma applications, pressure pulsation dampeners are especially important to avoid damage in sensitive chromatography columns and membrane separators. However, there are much fewer equipment options available for bio-pharma market due to the extreme design restrictions (very limited material approved, typically requiring USP Class VI) and cleanable, crevice-free designs compliant with design standards (such as the ASME BPE).

Furthermore, in the single use and biopharma realms, flow dampening is becoming an increasingly important factor for stability in dosing systems. Delivering smooth flow allows for greater precision in fluid delivery for vial filling, as well as improved effectiveness in membrane separation activities.

One key challenge for pressure stability is that the charge pressure needed in the dampener must be close to that of the mean pressure in the fluid system to optimize dampening efficiency. This is a real problem with the process changes in pressure. For example, in biopharma chromatography or membrane systems, the pressure feeding the column can vary significantly over the life of the separation cycle, causing significant changes in the dampener loading pressure requirement. A static loading pressure does not provide adequate pulsation dampening. Also, pulsations in sanitary systems often originate from the pump selection of diaphragm pumps, which are one of the leading technology choices in the industry due to its cleanable design characteristics.

Flow stability is a unique challenge, since the typical flow instability occurs from traditional positive displacement pumps such as a peristaltic pump. These are attractive for single use systems, since they are easy to set up, and only require tubing to compress to create flow. They generate flow through spring loaded rollers to create a flow. This comes at the consequence that at lower RPMs, the time between roller engagements is stretched out, creating more uneven flow profiles, and typically in a sinusoidal fashion. Existing pharma designs utilize diaphragm pumps, which can exhibit the same flow instability issues seen in peristaltic pumps.

In certain industries, especially bio-pharma, there is a desire to reduce overhead costs associated with cleaning and validation of a sterile work environment. It is possible to provide a separate pressure supply that is computer automated which tracks that of the local process pressure.

However, this method is relatively more expensive and involves changes to the end user's computer control system. In addition, this method is not fast enough to react to sudden changes in pressure, and certainly not fast enough to react to the pulsations from a typical multiple-head diaphragm pump.

There remains a need for an accurate cost-effective pulsation dampener, particularly for single use systems.

BRIEF SUMMARY OF THE INVENTION

This need is addressed by a pulsation dampener having a diaphragm configured to allow dampening air pressure to track the process pressure.

According to one aspect of the technology described herein, a pulsation dampener includes: a centerbody assembly having: a chamber including a first opening bounded by a wall defining a first surface; an outlet port communicating with the chamber; an inlet port communicating with the chamber; a flexible first diaphragm, wherein a perimeter of the first diaphragm is bonded to the first surface so as to define a seal that blocks the passage of fluid; a first cap disposed adjacent the first diaphragm, such that a first cavity is defined between the first cap and the first diaphragm; an inlet orifice formed in the first cap communicating with the first cavity; an exhaust orifice formed in the first cap communicating with the first cavity; and a valve seat disposed in the first cavity in fluid communication with the exhaust orifice, wherein the first diaphragm is moveable between an open position in which it is spaced away from the valve seat, and a closed position in which it seals against the valve seat.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
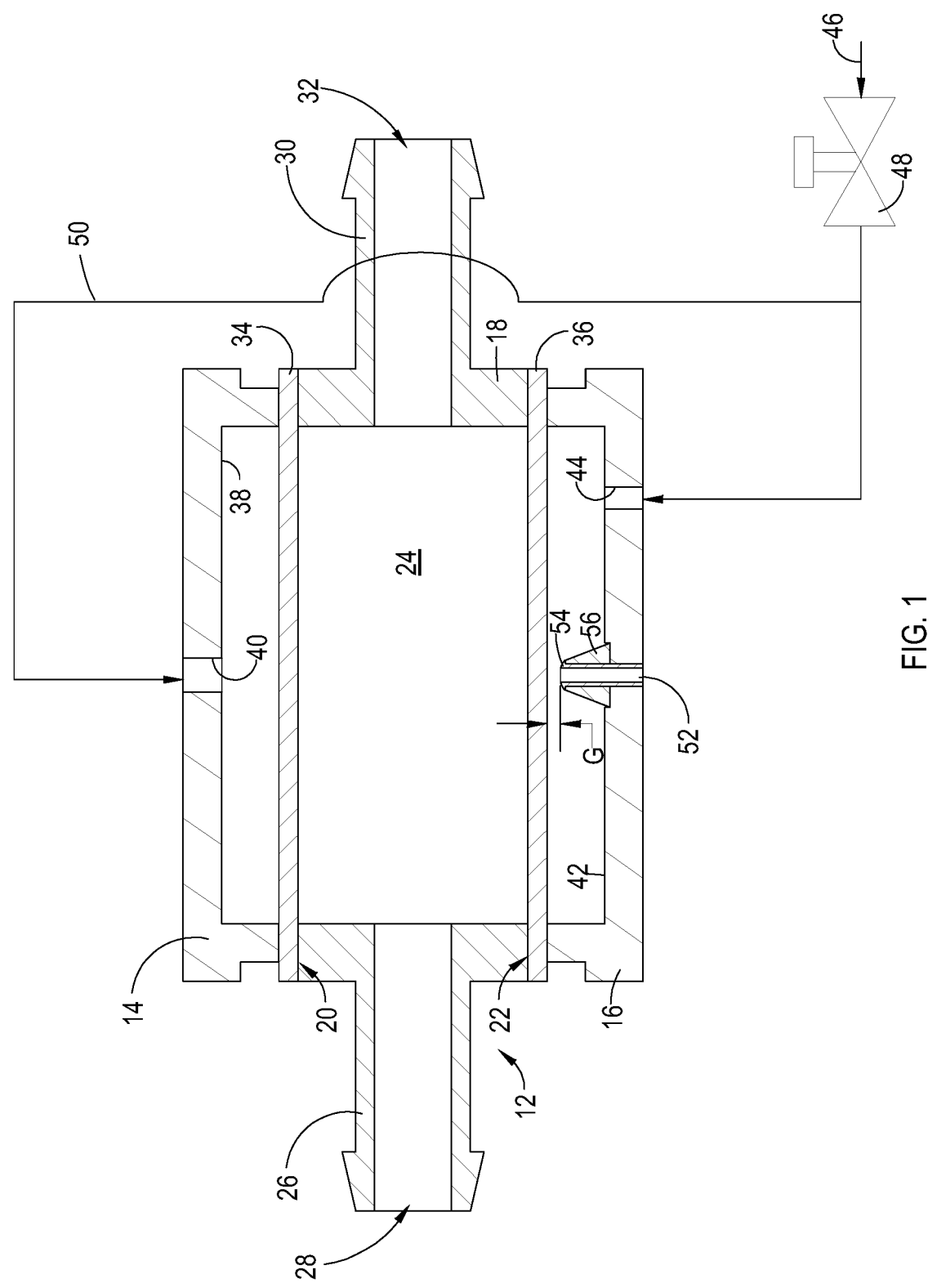
FIG. 1 is a cross-sectional view showing an exemplary embodiment of a pulsation dampener.

Now, referring to the drawings wherein identical reference numerals denote the same elements throughout the various views, FIG. 1 illustrates an exemplary pulsation dampener 10. The basic components of the pulsation dampener 10 are a centerbody assembly 12 and an enclosure assembly including a top cap 14 and a bottom cap 16.

As used herein, directional terms such as: "top", "bottom", "front", "rear", "left", "right" are used merely for convenience in description and do not require a particular orientation of the structures described thereby.

The centerbody assembly 12 includes a centerbody 18 having a top opening bounded by a wall defining a top surface 20 and an opposed bottom opening bounded by a wall defining a bottom surface 22. A liquid chamber 24 is formed in the centerbody 18. In this particular example it extends from the top surface 20 to the bottom surface 22.

The centerbody 18 includes an inlet fitting 26 defining an inlet port 28 of the pulsation dampener 10 which communicates with the liquid chamber 24, and an outlet fitting 30 defining an outlet port 32 of the pulsation dampener 10 which also communicates with the liquid chamber 24. In the illustrated example, the inlet and outlet fittings 26 and 30 have barb-type connectors suitable for connection to flexible tubing. Other types of connections may be used. For purposes of description, liquid flow is assumed to be from left to right in FIG. 1. Ideal embodiments of the diameter ratio of centerbody 18 diameter divided by inlet/outlet port 32 internal diameter ratio would be most preferred to trend to high values, but practical tradeoffs result in optimal ratios existing between 5:1 and 15:1, with preferred embodiments balancing practical size limitations to a 6:1-7:1 range.

The centerbody 18 may be manufactured using various methods such as machining from a block of precursor material, additive manufacturing processes (e.g., "3-D printing"), or molding from a polymer suitable for the application requirements. For best performance in a single-use application where sterility is important, a polymer with United States Pharmacopeia ("USP") class VI certification may be used. Nonlimiting examples of such materials include polyolefin (e.g., polyethylene, LDPE, HDPE, UHMWPE), PEEK, acetal polymer (e.g., DELRIN), PTFE, and PFA.

A flexible top diaphragm 34 is disposed against the top surface 20. For best performance in a single-use application where sterility is important, the top diaphragm 34 may be made from a material with USP class VI certification. Nonlimiting examples of such materials include TPU, TPE, polyolefin (LDPE, HDPE, UHMWPE, PP, etc.), PEEK, PTFE, PFA, FEP, a sulfone polymer such as RADEL, silicone, or other similar thermoplastic elastomer such as SANTOPRENE.

The perimeter of the top diaphragm 34 is sealed to the centerbody 18. As used herein, the term "sealed" implies that a boundary is present that blocks the passage of fluid, with the understanding that such boundary is not required to resist any specific magnitude of pressure differential. Rather, the seal is for the purpose of ensuring that the top diaphragm 34 is in the correct position and secured in robust enough manner to stay in place and maintain sterility during shipping and assembly.

Some nonlimiting examples of methods of creating a suitable seal include bonding methods, such as thermal bonding, sonic bonding, or adhesive bonding. Other options for sealing the top diaphragm 34 to the centerbody 18 include mechanical seals (not illustrated). Especially for single use systems, thermal sealing is preferred due to ease of assembly and handling (as opposed to mechanical seals), and optimal dust-ingress prevention during assembly (thermal sealing creates less opportunity for particulate ingress during assembly and handling).

A flexible bottom diaphragm 36 is disposed against the bottom surface 22. For best performance in a single-use application where sterility is important, the bottom diaphragm 36 may be made from a material with USP class VI certification. Nonlimiting examples of such materials include TPU, TPE, polyolefin (LDPE, HDPE, UHMWPE, PP, etc.), PEEK, PTFE, PFA, FEP, a sulfone polymer such as RADEL, silicone, or other similar thermoplastic elastomer such as SANTOPRENE. The preferred embodiment is to select a diaphragm material that has a moderate modulus of elasticity. Certain polymers may be required for chemical or other compatibility, but when possible, using lower modulus of elasticity Polyethylene diaphragms.

The perimeter of the bottom diaphragm 36 is sealed to the centerbody 18. As used herein, the term "sealed" implies that a boundary is present that blocks the passage of fluid, with the understanding that such boundary is not required to resist any specific magnitude of pressure differential. Rather, the seal is for the purpose of ensuring that the bottom diaphragm 36 is in the correct position and secured in robust enough manner to stay in place and maintain sterility during shipping and assembly.

Some nonlimiting examples of methods of creating a suitable seal include bonding methods, such as thermal bonding, sonic bonding, or adhesive bonding. In practice, the strength of this bond (e.g., thermal bond) reduces the dependency on assembly clamping forces when preparing a single use system. Preferably, the thermal bond should be strong enough to make a primary failure mode film (diaphragm) property failures, not thermal bond delamination. Other options for sealing the bottom diaphragm 36 to the centerbody 18 include mechanical seals (not illustrated).

In an alternative embodiment, the centerbody 18 may be made of a material not typically considered to be single-use, such as a metal or metal alloy, for example as stainless steel.

The top diaphragm 34 may be contained by any support structure that is strong enough to provide physical support for the top diaphragm 34 up to the intended use pressure. For example, it may be made of a metal or metal alloy such as stainless steel. In the illustrated example, the enclosure assembly includes top cap 14 which serves as a support structure for the top diaphragm 34. The top cap 14 has a disk-like shape with an internal cavity 38 and an integral port 40 connected in fluid communication with the cavity 38.

It will be understood that the top diaphragm 34 is considered optional. In an alternative embodiment, not separately illustrated, the top diaphragm 34 could be eliminated and the top cap 14 coupled directly to the centerbody 18, or the centerbody 18 could be manufactured without the top opening illustrated in FIG. 1.

The bottom diaphragm 36 may be contained by any support structure that is strong enough to provide physical support for the bottom diaphragm 36 up to the intended use pressure. For example, it may be made of a metal or metal alloy such as stainless steel. In the illustrated example, the enclosure assembly includes bottom cap 16 which serves as a support structure for the bottom diaphragm 36. The bottom cap 16 has a disk-like shape with an internal cavity 42.

Means are provided for joining the components of the enclosure assembly and to hold pressure forces. For example, clamping bolts or other similar fasteners (not shown) may be used to couple the top cap 14 to the bottom cap 16, with the centerbody 18 clamped between them. Gaskets or seals of a conformable material such as rubber (not shown) may be used between the top cap 14 and the centerbody 18 and/or between the bottom cap 16 and the centerbody 18. This would allow for warping tolerance on assembled components.

The bottom cap 16 includes an inlet orifice 44 in throttled fluid communication with the cavity 42. In use this would be coupled to an air supply 46, shown schematically, such as a utility compressed air system. While the terms "air" and "pneumatic" will be used herein, it will be understood that the air supply 46 could comprises other gas compositions. As discussed in more detail below, the inlet orifice 44 may be sized to provide a predetermined air flow rate, given a predetermined gas supply pressure. Optionally, a variable-flow device such as a needle valve 48 may be connected between the inlet orifice 44 and the air supply 46. The cavity 42 of the bottom cap 16 may be interconnected with the cavity 38 of the top cap 14, for example by line 50 which is shown teed into the air supply 46 downstream of the needle valve 48.

Figure 2:
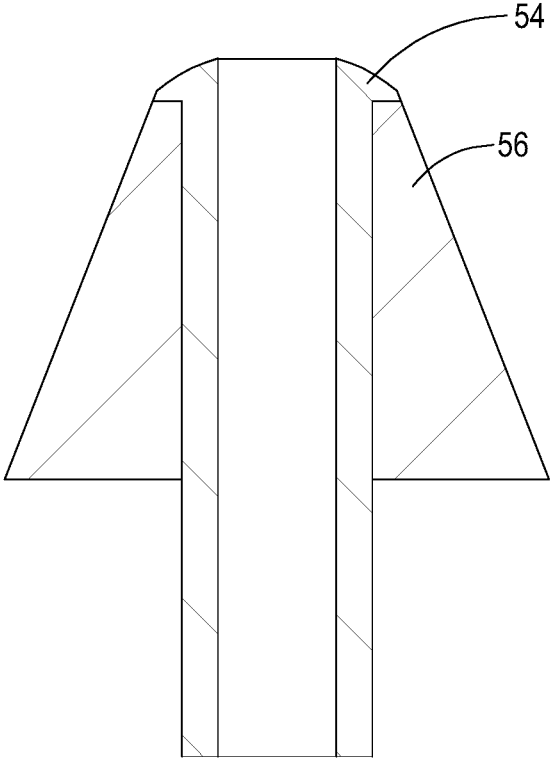
FIG. 2 is an enlarged view of a portion of the pulsation dampener shown in FIG. 1.

The bottom cap 16 also includes an exhaust orifice 52 in fluid communication with the cavity 42. As discussed in more detail below, the exhaust orifice 52 may be sized to provide a predetermined gas flow rate given a predetermined gas pressure. The bottom cap 16 further includes a valve seat 54 in fluid communication with the cavity 42 and the exhaust orifice 52. The valve seat 54 is positioned so that it is close to but not touching the bottom diaphragm 36 in a neutral position. For example, it may have a static gap "G" of approximately 0.13 mm (0.005 in.). This static gap refers only to the maximum position at which the bottom diaphragm 36 adjusts its exhibited flow coefficient Cv. Considering the supply orifice Cv (a fixed value based on the diameter selected), the pneumatic valve assembly (comprising bottom diaphragm 36 in combination with valve seat 54) has a Cv range from 0 to some non-zero maximum. This non-zero maximum will consider both the supply and exhaust orifice values in series to result in the max Cv case. For example, considering a supply orifice of 0.13 mm (0.005 in.) and an exhaust orifice of 0.51 mm (0.020 in.), this means the valve assembly has a Cv range of 0-0.000449. To realize this Cv range, the bottom diaphragm 36 will adjust its position from no gap (contacting/blocking flow) up to a d/4 gap, for example 0.13 mm (0.005 in.) as referred to above. Optionally, as best seen in FIG. 2, the valve seat 54 may be mounted to the exhaust orifice 52 using a mount 56 of resilient material such as silicone rubber. This is useful for preventing damage or wear to the bottom diaphragm 36, and providing additional dampening capabilities. Mount 56 may be constructed from a USP compliant material, and typically offer a Shore 10A or similar dampening characteristic. Finally, the compressible nature of mount 56 allows for the sealing plane to move linearly with pulsations, ensuring the response time constant of the system is proportionally low to the high frequency that pulsations are generated. The compressible mount 56 furthermore allows for this sealing plane to move linearly with pulsation environments to allow for the sealing plane to be quickly "reachable" by the bottom diaphragm 36 at any point in the bottom diaphragm's stroke.

The pulsation dampener as described above is operable to mitigate pressure and flow rate fluctuations in a downstream system. The pulsation dampener 10 operates as a pressure sensing device which senses the position of bottom diaphragm 36 and which uses the position of the bottom diaphragm 36 to sense and control the dampening air pressure.

A continuous bleed of air is provided to allow air to escape from the pulsation dampener 10, serving as a means for pressure drop if the process pressure drops; the exhaust orifice 52 thus also serves as a leak evident port. The leak evident port is intended to alarm operators of a diaphragm compromise and to prevent contamination from entering the sanitary process by preventing pressure build-up in the lower cavity 42.

In a preferred embodiment, the inlet orifice 44 and exhaust orifice 52 are sized such that the system can effectively fill and release a small amount of mass with each pump pulsation to provide additional pulsation dampening beyond that of having the correct charge mass (seen as constant across short term pulsation cycles). In the illustrated embodiment the pneumatic pressure, which quickly equalizes with the system pressure, is also sent to the top diaphragm 34 which is oriented in opposition to the bottom diaphragm 36, to increase the sensing area of the device. In one example, the inlet orifice has a diameter of approximately of 0.13 mm (0.005 in.), and the exhaust orifice has a diameter of approximately 0.51 mm (0.020 in.). The most preferred embodiment utilizes an inlet orifice that is more restrictive than the exhaust orifice. The inlet orifice being the most restrictive point in the system provides best operation it should be the dominating restriction in the dampener pneumatic series. The restriction at the inlet orifice will account for response time in the system.

The inlet orifice 44 and exhaust orifice 52 may be sized and positioned such that the system can effectively fill and release mass as described above. Furthermore, the sizing interaction with respect to the minimum/maximum capacity of the inlet/exhaust orifices should be considered with respect to the control volume such that the capacity allows it to quickly keep up with the high speed fluctuations in the system. This is an important function for flow stabilization, since when the flow is in its minimum phase of its sine wave, the dampener 10 needs to apply pneumatic work to the fluid boundary to accelerate the fluid again, increasing flow. This is a pump-like action, making the device operate in a work-adding mode when the flow is below desired values, and a volume expanding mode when the flow is too great. This function is important to realize, since the process liquid side is the element that imparted the work/energy exchange onto the pneumatic side in the first place. The feature of dampening high pressure pulsations on the positive side by volume expansion on the process (compression on the pneumatic side) is the very same energy exchange that will assist with fluid acceleration during the "trough" of the sine wave so to speak. This is highly important to the function of this device, and explains why this device is a pressure dampener and a flow normalizer.

As an additional consideration, the exhaust orifice diameter may relate directly to the stroke (displacement) of the bottom diaphragm 36. A larger exhaust orifices will require more stroke to fully close relative to a smaller exhaust orifice. In a typical embodiment this ratio of orifice diameter to cavity depth (i.e. vertical dimension) may be in the 1:10-1:15 range but may vary based on available working diameters in the centerbody assembly 12.

In use, the double diaphragm embodiment depicted in FIG. 1, would be pneumatically set a pressure "P1" by introduction of air into the lower cavity 42. P1 would be approximately equal to system pressure "P". The device works such that the bottom diaphragm 36 senses system pressure "P" in the liquid chamber 24, depressing it onto the valve seat 54 and resilient mount 56. The resilient mount 56 acts as a mild spring-loaded dampener, providing minor volume changes to the diaphragm position as forces on the bottom diaphragm 36 vary.

While the exhaust orifice 52 is closed off, the air supply fills the lower cavity 42 at a rate proportional to the inlet orifice size. It is preferred that the air supply pressure available will be substantially greater than system pressure P to ensure that full rangeability of the device is realized. As the cavity pressure P1 increases, eventually there will be a moment where P1 is greater than system pressure P, and the bottom diaphragm 36 will lift. The diaphragm lifting does pneumatic work on the system fluid, which is amplified by the upper diaphragm mimicking the P1 controlled pressure, which will amplify the volume change (i.e., volume decrease) in the system. This is a pump-like action. The device then operates in constant fluctuation, responding to system pressure changes by modulating diaphragm position to balance the P1 pneumatic pressure. This balance allows the system to do work on the fluid when pressure is low, accelerating flow, and expansion when the pressure is too great. The supply pressure here is one variable that allows for P1 to climb, but equally important is the pneumatic compression that the pneumatics will experience form the system expansion that will increase P1. Mass supplied to the system will be at a linear rate, whereas the pressure change from volume changes will occur in an exponential rate (P=c/V, where C=constant, P=pressure, V=volume).

Alternatively, the inlet orifice 44 could be replaced with a variable device. This variable device may use a local pressure sensor as feedback, or some other means, but the objective would be to change the rate of the fill to the system in balance with the demands of the flow stabilization required.

Various dimensions of the individual components may be selected to result in a desired performance of the pulsation dampener 10.

Figure 3:
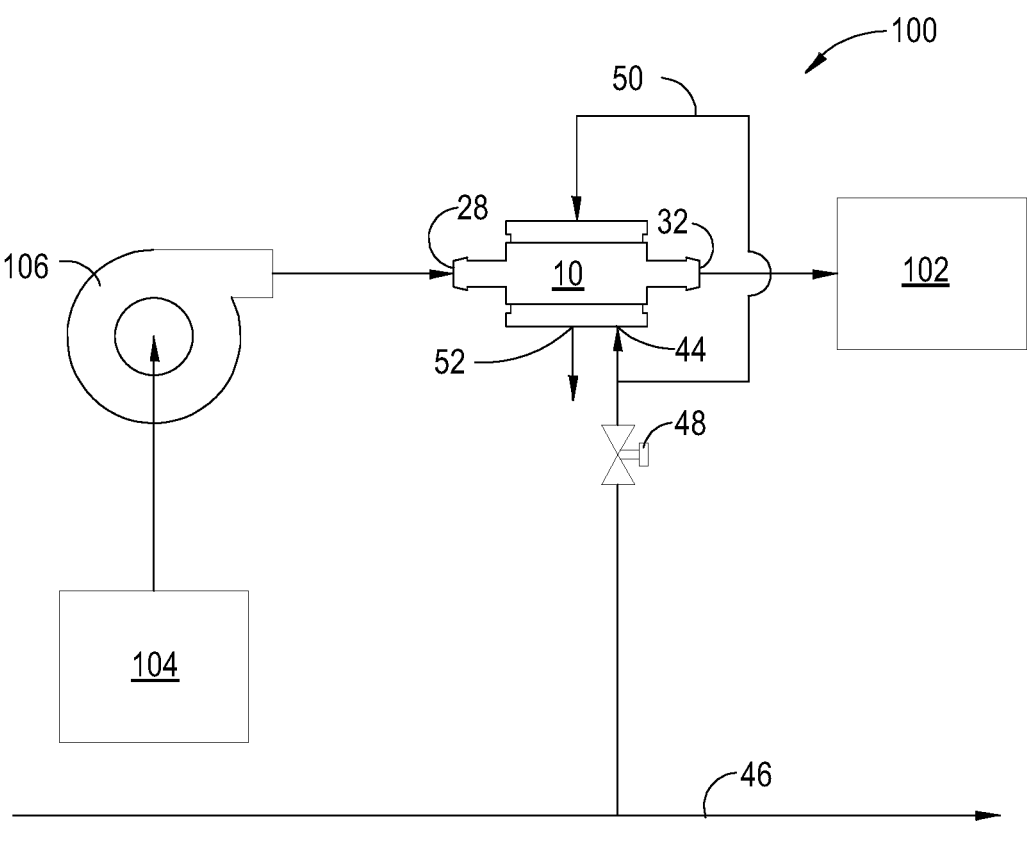
FIG. 3 is a flow diagram of the pulsation dampener of FIG. 1 connected to a fluid system.

FIG. 3 is a schematic representation of a representative industrial process 100 incorporating the pulsation dampener 10 described above. This is but one of many types of process system which utilize a pulsation dampener. The system includes a process vessel 102 to be supplied with process liquid from a supply 104. The liquid supply 104 is pumped to the process vessel 102 using a positive-displacement pump 106 such as a peristaltic pump. The inlet port 28 of the pulsation dampener 10 is connected to the output of the pump 106. The outlet port 32 of the pulsation dampener 10 is connected to the process vessel 102. The inlet orifice 44 of the pulsation dampener 10 is connected to the air supply 46, optionally through needle valve 48. The exhaust orifice 52 of the pulsation dampener 10 may be vented to atmosphere.

The pulsation dampener described above has numerous advantages over prior art pulsation dampeners. It is of simple construction and sufficiently economical that at least portions of it can be considered single-use and/or disposable. It may be made from materials that can be sterilized and are compatible with biochemical processes such as USP class VI certified and BPA-free polymer. Testing suggests that having the air pressure in the dampener closely track that of the process pressure provides a significant improvement over other passive methods of dampening, such as static air pressure loadings, springs, or compressible materials.

The foregoing has described single-use pulsation dampeners. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A pulsation dampener, comprising:
a centerbody assembly having:
a chamber including a first opening bounded by a wall defining a first surface;
an outlet port communicating with the chamber;
an inlet port communicating with the chamber;
a flexible first diaphragm, wherein a perimeter of the first diaphragm is bonded to the first surface so as to define a seal that blocks the passage of fluid;
a first cap disposed adjacent the first diaphragm, such that a first cavity is defined between the first cap and the first diaphragm;
an inlet orifice formed in the first cap communicating with the first cavity;
an exhaust orifice formed in the first cap communicating with the first cavity; and
a valve seat disposed in the first cavity in fluid communication with the exhaust orifice, wherein the first diaphragm is moveable between an open position in which it is spaced away from the valve seat, and a closed position in which it seals against the valve seat.

2. The dampener of claim 1 wherein the valve seat is held in a resilient mount.

3. The dampener of claim 1 wherein the centerbody assembly is polymer and the first cap is a metal alloy.

4. The dampener of claim 1, further comprising:
the chamber including a second opening bounded by a wall defining a second surface;
a flexible second diaphragm, wherein a perimeter of the second diaphragm is bonded to the second surface so as to define a seal that blocks the passage of fluid; and
a second cap disposed adjacent the second diaphragm, such that a second cavity is defined between the second cap and the second diaphragm.

5. The dampener of claim 4 wherein the first cavity and the second cavity are connected in fluid communication.

6. The dampener of claim 4 wherein the centerbody assembly is polymer and the second cap is a metal alloy.

7. The dampener of claim 1 wherein the first diaphragm is polymer.

8. A combination, comprising:
the dampener of claim 1;
a positive displacement pump connected to the inlet port; and
an air supply coupled to the inlet orifice.

9. The combination of claim 8, further comprising a variable-flow device connected between the inlet orifice and the air supply.

10. The combination of claim 9, wherein the variable-flow device is a needle valve.

11. The combination of claim 8, further comprising:
the chamber includes a second opening bounded by a wall defining a second surface;
a flexible second diaphragm, wherein a perimeter of the second diaphragm is bonded to the second surface so as to define a seal that blocks the passage of fluid;
a second cap disposed adjacent the second diaphragm, such that a second cavity is defined between the second cap and the second diaphragm; and
wherein the first cavity and the second cavity are connected in fluid communication with the air supply.

12. The combination of claim 11 wherein the first diaphragm is polymer.

* * * * *